INTERMITTENT DRIVE MECHANISM

Filed June 11, 1965

FLOYD M. GALBRAITH, JR
INVENTOR.

BY K. Frank Smith
David P. Ogden
ATTORNEYS

United States Patent Office 3,335,301

Patented Aug. 8, 1967

3,335,301

INTERMITTENT DRIVE MECHANISM

Floyd M. Galbraith, Jr., Rochester, N.Y., assignor to Eastman Kodak Company, Rochester, N.Y., a corporation of New Jersey Filed June 11, 1965, Ser. No. 463,154

10 Claims. (Cl. 310—23)

The present invention relates to an intermittent drive mechanism for converting reciprocating motion to rotary motion, and more particularly, to a vibrator type electric motor providing rotary motion.

In the art of intermittent drive or vibratory mechanisms, several relatively complex systems have been devised for converting vibratory motion into rotary motion by means of cams, pawls and the like. However, most of the motors of this type are of relatively low torque and tend to be quite bulky compared to the power developed thereby. Similarly, implements for changing reciprocating motion to rotary motion are often relatively complex.

Therefore, an object of the present invention is to provide an improved mechanism for changing reciprocating motion to rotary motion.

A further object is to provide an improved intermittent drive electric motor.

In accordance with one embodiment of my invention, a magnetic coil and armature co-operate to intermittently reciprocate a shaft. One end of the shaft is attached to the center of a disk spring member having a pie-shaped section cut therefrom whereby flexing along its axis causes the disk to assume a modified conical shape. Since the cone has a smaller overall diameter than the disk, the pie-shaped portion of the disk is contracted whereby ratchet pawl teeth thereof advance over a ratchet surface one tooth distance per cycle of the reciprocating shaft.

The subject matter which is regarded as my invention is particularly pointed out and distinctly claimed in the concluding portion of this specification. The invention, however, as to its organization and operation, together with further objects and advantages thereof, will best be understood by reference to the following description taken in connection with the accompanying drawing, in which:

Figure 1:
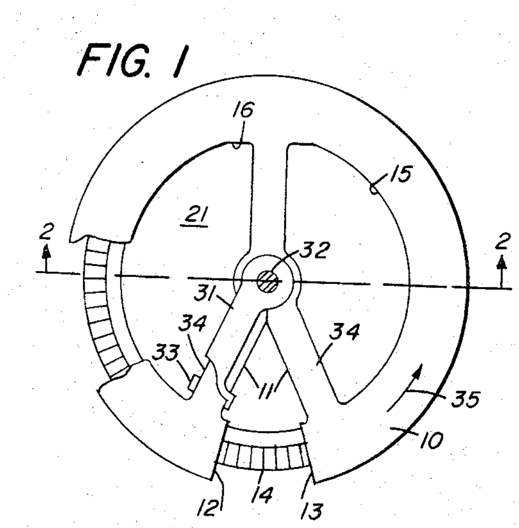
FIG. 1 is a top plan view partially in section of one embodiment of my invention.

Referring now to the drawing, wherein like numbers indicate similar parts, I have shown in FIG. 1 a top plan view of a normally flat disk-shaped member or disk 10 made of a spring material such as brass and having a pie-shaped section or sector 11 removed therefrom whereby intermittent vertical flexing of the disk 10 causes disk drive pawls 12 and 13 at the periphery of the sector 11 to be drawn together so that they advance one tooth distance on a ratchet surface means 14 during each flexure cycle. This phenomenon results from the fact that the effective circumference of the disk member 10 is reduced when it is distorted to a conical shape. In order to provide desired flexibility of the spring disk 10, additional areas 15 and 16 are removed therefrom. Because of the frictional engagement, the surface 14 is preferably made of a slippery material such as Delrin plastic.

Figure 2:
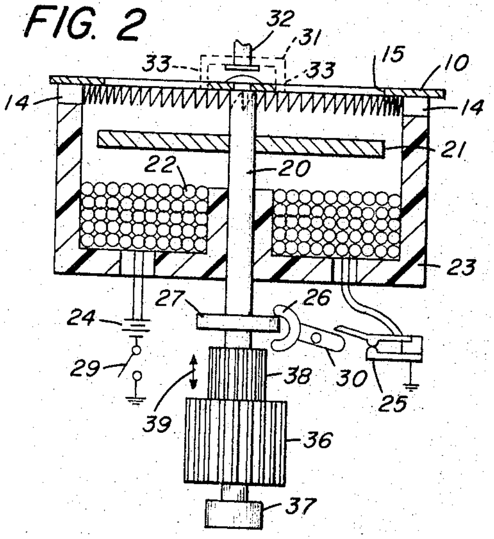
FIG. 2 is a section elevation view taken along line 2—2 of FIG. 1.

Referring now to FIG. 2, the sectional elevation view illustrates a drive shaft 20 having thereon an armature 21 which is alternately attracted and released by magnetic flux developed by a coil 22. The shaft 20 and coil 22 are supported in a stationary housing 23 having as its upper surface the ratchet means 14. The shaft 20 is supported by a central portion of the housing 23 to be reciprocated and rotated therein. The coil 22 could, of course, be energized by various power sources. However, in hand-carried equipment, such as cameras and the like, it is most convenient to use a battery power source as indicated at 24 with a make and break switch 25 activated by a pawl 26 operated by a disk 27 forming a part of the shaft 20. When a switch, such as a trigger switch 29 is closed, the energization of the coil 22 is completed whereupon the armature 21 and shaft 20 are moved downward. This downward motion of the shaft rotates the switch pawl 26 about a pivot 30 whereby the switch 25 is opened, the magnetic flux of the coil is dissipated and the armature 21 and the shaft 20 are returned to the standby position indicated in response to the spring action of the disk 10.

Figure 3:
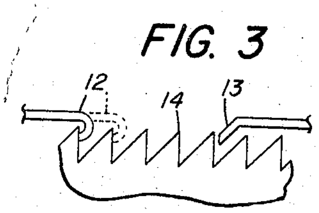
FIG. 3 is a detail view of the pawls and co-operating ratchet teeth.

As illustrated in FIG. 3, downward flexing motion of the disk 10 moves it from the relatively flat position of FIG. 2 to a more conical configuration and causes the pawl element 12 to move closer to pawl element 13 as indicated in dashed lines, with the pawl 13 engaging one of the teeth of the ratchet means 14. With the pawl 12 in the position indicated in dashed lines, the magnetic circuit is released whereupon the disk 10 returns to its standby position, and since the pawl 12 is maintained by the ratchet surface means 14, the pawl 13 moves to a next position relative to the surface 14. Obviously, the extent of the flexing of the disk 10 may be modified to match the spacing of the teeth on the ratchet surface 14.

To utilize the rotary power developed by the ratchet drive of this system, a lug 31 is coupled on a coaxial shaft 32. This lug has teeth 33 that partially surround one of the several spokes 34 of the disk 10. With flexible disks of this type, it is preferred that at least three spokes 34 be provided to allow axial flexing without substantial bending of the shaft 20. As shown in solid lines in FIG. 1, the lug 31 follows the stepping motion of the drive pawl 12. As shown in dashed lines at 33 in FIG. 2 the lug teeth are coupled to follow the rear spoke of the disk to attain a slightly smoother drive force. In either case, the coaxial shaft 32 is driven by the intermittent movement as indicated at 35 (FIG. 1) of the disk 10.

In FIG. 2 another drive system is illustrated wherein a power take-off gear 36 is mounted on a nonreciprocating bearing 37 and is engaged by an internal gear 38 which rotates and reciprocates in response to the magnetic and ratchet drive of the shaft 20. The added axial length of the gears 37 and 38 is because of the reciprocation motion of the shaft 20 as indicated by the double-ended arrow 39. Because of this motion, I prefer that at least one of the gears 37 and 38 be made of a slippery material such as stabilized nylon plastic or filled Teflon plastic to reduce to a minimum the frictional losses of the system.

Figure 4:
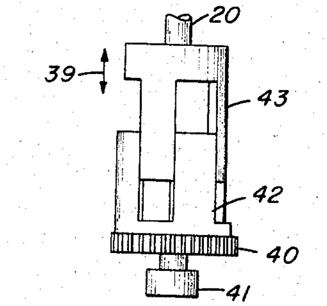
FIG. 4 is another embodiment of a coupling of the type indicated in FIG. 2.

A somewhat similar drive is shown in FIG. 4 wherein gear 40 is mounted in a nonreciprocating bearing 41. The gear 40 has upwardly extending teeth forming a spline 42 engaged by a mating spline 43 mounted on the end of the shaft 20. Similarly, this spline 43 reciprocates as indicated by the double-ended arrow 39 with the teeth of the splines 42 and 43 varying in engagement during such a reciprocation. However, because of the length of the splines 42 and 43, a continuous driving engagement is maintained.

Figure 5:
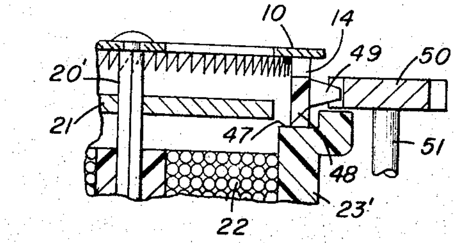
FIG. 5 is a further coupling embodiment.

Another type of drive is indicated in FIG. 5 wherein the housing 23' of the coil 22 is made of a material such as spun aluminum instead of plastic. The upper portion of the housing 23' forms a bearing surface 47 supporting a slippery plastic hoop 48 having the ratchet surface 14 on top and outwardly projecting gear teeth 49 which drive a gear 50 and a shaft 51 in rotary power take-off motion. The spring bias of the disk 10 is sufficient to hold the hoop 48 in place. When using this power take-off system, the bearing portion of the shaft 20' is made square or otherwise nonrotatable so that the disk 10 does not rotate during driving of the hoop 48.

While I have shown a particular embodiment of this invention, modifications thereof will occur to those skilled in this art. For instance, the flat position of the disk 10 as indicated could be conical with the flexing resulting in a more conical configuration. Moreover, the disk 10 can be normally conical to be driven by flexing to a flat configuration by reciprocation of the shaft 20. Furthermore, the drive pawls 12 and 13 do not need to be precisely at the edges of the sector 11, but may be set back therefrom somewhat. I intend therefore to have the appended claims cover such embodiments as properly fall within the scope of the present invention.

I claim:

1. An intermittent drive electric motor comprising:

an intermittently energizable coil;

a shaft;

an armature secured to said shaft and responsive to said coil for reciprocating said shaft;

a flexible disk having a sector removed therefrom, said shaft being secured to said disk to flex it between relatively flat configurations to a modified conical shape during reciprocations thereof; and a ratchet surface supporting said disk at its periphery, said disk having drive pawls engaging said ratchet surface near the edges of the sector whereby each cycle of flexing advances the disk relative to said surface one tooth step to provide rotary motion.

2. An intermittent drive motor as in claim 1 wherein said disk is of a spring material, and said ratchet surface is of a slippery plastic material.

3. An intermittent drive motor as in claim 1 wherein power take-off gearing is drivably coupled to said shaft to utilize the rotary power motion.

4. An intermittent drive motor as in claim 1 wherein said disk has sections removed from its area to define at least three spokes coupling the disk center to its periphery, and said shaft is coupled to the disk center.

5. A rotary electric motor, comprising:

a flexible disk having a sector removed therefrom;

a ratchet means engaging said disk;

a pair of drive pawls at the periphery of the sector for engaging said ratchet means; and electric drive means for cyclically flexing the disk to vary the spacing between said drive pawls to develop rotary motion between said disk and said ratchet means.

6. A rotary motor as in claim 5 wherein said electric drive means comprises a shaft coupled to the center of said disk; and electric means for reciprocating said shaft to flex said disk an amount sufficient to advance each of said drive pawls one tooth distance on said ratchet means per cycle.

7. A rotary motor as in claim 5 having gear teeth on said ratchet means to thus develop a rotary power take-off drive.

8. A reciprocating-to-rotary motion drive mechanism comprising:

a flexible, generally disk-shaped member having a sector-shaped notch;

a pair of pawl elements near opposite edges of said notch;

ratchet means supporting said pawl elements in a driving relationship; and drive means coupled to a disk-shaped member for cyclically flexing it so that said pawl elements move relative to one another in a plane generally parallel to the ratchet surfaces of said ratchet means, such movement of said pawl elements causing them to coact with successive teeth on said ratchet means to produce relative rotary movement between said disk-shaped member and said ratchet means.

9. A reciprocating-to-rotary motion drive mechanism as in claim 8 wherein said disk-shaped member and the surface of said ratchet means are coaxial so that the periphery of said disk-shaped member is supported by said ratchet means, and said drive means includes a shaft coupled to flex the center of said disk-shaped member.

10. A reciprocating-to-rotary motion drive mechanism as in claim 8 wherein said ratchet means is a hoop and said disk-shaped member is maintained nonrotatable, said hoop having thereon rotary power take-off means drivable thereby.

No references cited.

MILTON O. HIRSHFIELD, *Primary Examiner.*

D. F. DUGGAN, *Assistant Examiner.*